United States Patent
Izumiya

(10) Patent No.: US 9,782,863 B2
(45) Date of Patent: Oct. 10, 2017

(54) SCREW TIGHTENING APPARATUS

(71) Applicant: FANUC CORPORATION, Yamanashi (JP)

(72) Inventor: Shun Izumiya, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 265 days.

(21) Appl. No.: 14/813,264

(22) Filed: Jul. 30, 2015

(65) Prior Publication Data

US 2016/0031051 A1 Feb. 4, 2016

(30) Foreign Application Priority Data

Aug. 4, 2014 (JP) .................................. 2014-158896

(51) Int. Cl.
| | |
|---|---|
| *B23P 19/06* | (2006.01) |
| *B25B 23/06* | (2006.01) |
| *B25B 23/12* | (2006.01) |
| *B25J 11/00* | (2006.01) |

(52) U.S. Cl.
CPC .............. *B23P 19/06* (2013.01); *B25B 23/06* (2013.01); *B25B 23/12* (2013.01); *B25J 11/00* (2013.01)

(58) Field of Classification Search
CPC ........... B23P 19/06; B25B 23/06; B25B 23/12
See application file for complete search history.

(56) References Cited

U.S. PATENT DOCUMENTS

| | | | | |
|---|---|---|---|---|
| 6,289,769 B1 * | 9/2001 | Rankin | ................. | B23P 19/006 81/55 |
| 6,952,853 B2 * | 10/2005 | Rahmsdorf | ............. | B23B 47/28 7/158 |
| 8,904,615 B2 * | 12/2014 | Ohno | ...................... | B23P 19/06 227/109 |
| 9,316,247 B2 * | 4/2016 | Butvin | ................... | B21J 15/022 29/505 |

FOREIGN PATENT DOCUMENTS

JP         6218637 A         8/1994

OTHER PUBLICATIONS

English Abstract and machine translation for Japanese Publication No. 6-218637, published Aug. 9, 1994, 15 pgs.

* cited by examiner

*Primary Examiner* — David B Thomas
(74) *Attorney, Agent, or Firm* — Fredrikson & Byron, P.A.

(57) ABSTRACT

A screw tightening apparatus includes a magazine plate with a through hole formed in a first direction, a rotary rod device configured to rotate a rotary part having a tip portion, a servo motor which moves the magazine plate in a second direction, a cylinder device which moves the rotary rod device in the first direction, and a screw tightening control unit which controls the servo motor so as to locate the tip portion of the rotary rod device coaxially with the through hole, and controls the cylinder device so as to cause the tip portion of the rotary part to pass the through hole and to abut on the head of the bolt.

5 Claims, 6 Drawing Sheets

SCREW TIGHTENING APPARATUS

BACKGROUND OF THE INVENTION

1. Field of the Invention

The present invention relates to a screw tightening apparatus which screws a bolt into a screw hole of an object to be screwed.

2. Description of the Related Art

Apparatuses have thus far been known that tighten a screw with a screw tightening unit attached to a tip portion of a robot (for example, Japanese Laid-open Patent Publication No. 6-218637). The apparatus according to Japanese Laid-open Patent Publication No. 6-218637 includes a circular disk-shaped magazine having a plurality of screw retaining grooves formed along the outer periphery, and a nut runner which moves relative to the magazine. A bolt is removably and elastically supported in each of the retaining grooves of the magazine, and a socket of the nut runner is fitted on the head of the bolt. Then the magazine is rotated so as to remove the bolt from the magazine, and the bolt is tightened by the nut runner.

However, with the apparatus according to Japanese Laid-open Patent Publication No. 6-218637, the magazine has to be rotated in order to remove the bolt from the magazine, and therefore a complicated mechanism has to be employed. In addition, the bolt has to be completely removed from the magazine before the bolt is tightened by the nut runner, which prolongs the cycle time of the bolt-tightening process as a whole.

SUMMARY OF INVENTION

In an aspect, the present invention provides a screw tightening apparatus which screws a bolt into a screw hole of an object to be screwed. The screw tightening apparatus includes a magazine plate including a first face and a second face opposite to the first face, a through hole formed in a first direction extending from the first face to the second face, and a bolt setting part provided at an opening edge of the through hole on a side of the first face and configured to set the bolt coaxially with the through hole, with a head of the bolt disposed so as to cover the through hole. The screw tightening apparatus includes a rotary rod device including a rotary part extending parallel to the first direction with a tip portion opposed to the second face of the magazine plate, the rotary rod device including a rotary drive unit which rotates the tip portion. The screw tightening apparatus includes a first moving unit which moves the magazine plate relative to the rotary rod device in a second direction perpendicular to the first direction, and a second moving unit which moves the rotary rod device in the first direction. The screw tightening apparatus includes a screw tightening control unit which controls the first moving unit so as to locate the tip portion of the rotary rod device coaxially with the through hole, and controls the second moving unit so as to cause the tip portion of the rotary rod device to pass the through hole and abut on the head of the bolt in the state where the tip portion of the rotary rod device is located coaxially with the through hole.

BRIEF DESCRIPTION OF THE DRAWINGS

The objects, features and advantages of the present invention will become more apparent through the description of an embodiment given hereunder with reference to the accompanying drawings, in which.

DETAILED DESCRIPTION

Figure 1:
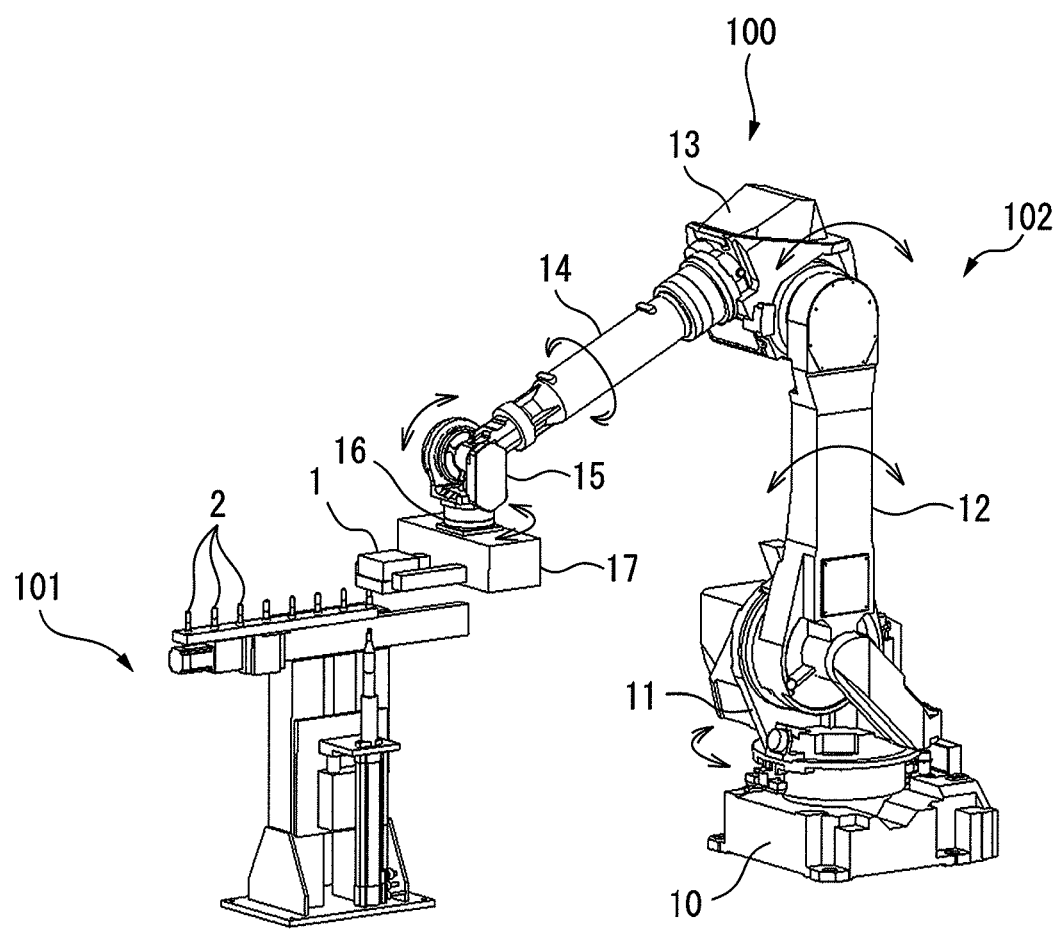
FIG. 1 is a diagram which shows a configuration of a screw tightening apparatus according to the embodiment of the present invention.

Hereafter, an embodiment of the present invention will be described with reference to FIG. 1 to FIG. 8. FIG. 1 is a diagram which shows a configuration of a screw tightening apparatus 100 according to the embodiment of the present invention. The screw tightening apparatus 100 is configured to screw a bolt 2 in a screw hole formed in an object 1, and includes a screw tightening unit 101 and a robot 102 which transports the object 1 to the screw tightening unit 101.

The robot 102 is a vertical multi-particular robot, and includes a pedestal 10, a base portion 11 rotatably mounted on the pedestal 10, a first arm 12 pivotably supported by the base portion 11, an articular joint 13 pivotably supported by the first arm 12 at a tip portion thereof, and a second arm 14 pivotably supported by the articular joint 13. The robot 102 also includes an articular joint 15 pivotably supported by the second arm 14, a flange 16 rotatably supported by the articular joint 15, and a hand 17 attached to the flange 16 so as to grip the object 1. The articular joints of the robot 102 each include a servo motor 18 (see FIG. 4), so that the robot 102 is driven by the servo motor 18. The position and posture of the object 1 can be adjusted by driving the robot 102.

Figure 2:
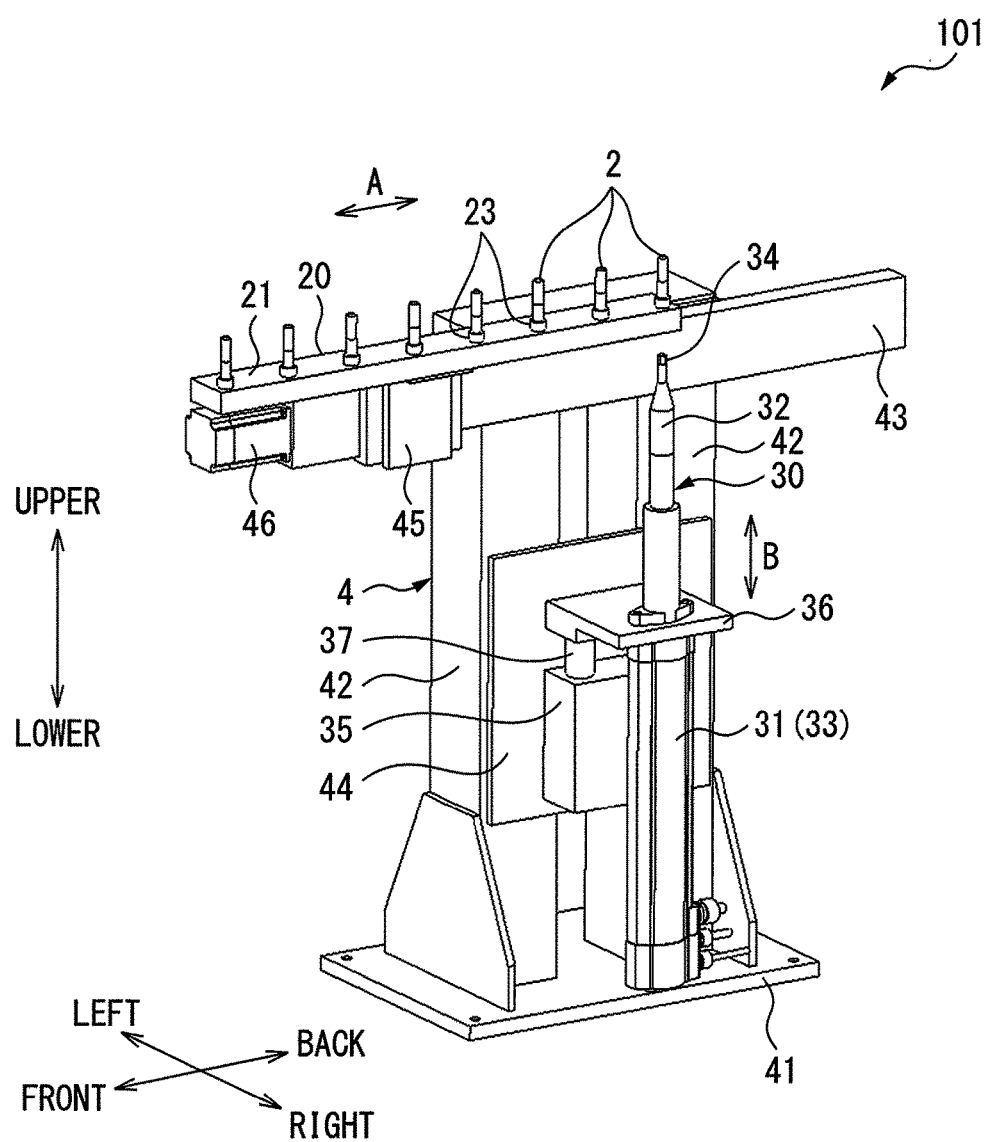
FIG. 2 is an enlarged perspective view of a screw tightening unit included in the screw tightening apparatus of FIG. 1.

FIG. 2 is an enlarged perspective view illustrating an essential part of the screw tightening unit 101. Hereinafter, a front-back direction, a left-right direction, and an up-down direction will be defined as indicated in FIG. 2 for the sake of convenience, and the configuration of each constituent will be described on the basis of the directions thus defined. The screw tightening unit 101 includes a magazine plate 20 in which a plurality of bolts 2 are placed in advance, and a rotary rod device 30 to be engaged with the head of each of the bolts 2 and to screw the bolt 2 in the screw hole of the object 1. The magazine plate 20 and the rotary rod device 30 are supported by a frame 4.

The frame 4 includes a base plate 41, a pair of support columns 42 erected on the base plate 41 and aligned in the front-back direction, an upper plate 43 fixed to the upper end portion of the support column 42 and extending in the front-back direction, and a side plate 44 fixed to the right face of the support columns 42. A non-illustrated ball screw extending in the front-back direction is rotatably disposed in the upper plate 43. A non-illustrated nut is thread-fitted on the ball screw, and a sliding member 45 is integrally attached to the nut. A servo motor 46 is connected to an end portion of the ball screw. When the servo motor 46 is driven so as to rotate the ball screw, the sliding member 45 is caused to move in the front-back direction along the upper plate 43.

The magazine plate 20 is a generally rectangular plate-shaped member elongate in the front-back direction and having a constant width in the left-right direction, and fixed to the upper end portion of the sliding member 45. Accordingly, the magazine plate 20 is caused to move in the front-back direction (direction of an arrow A) together with the sliding member 45, when the servo motor 46 is activated. A plurality of bolt setting parts 23 are aligned in the front-back direction at regular intervals on the upper face 21 of the magazine plate 20, and the bolts 2 are respectively placed on the bolt setting parts 23.

Figure 3:
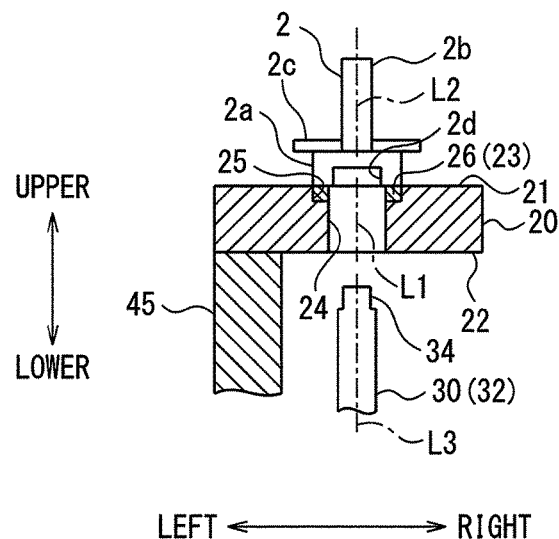
FIG. 3 is a cross-sectional view of main part of the magazine plate in FIG. 2.

FIG. 3 is a cross-sectional view of main part of the magazine plate 20, mainly illustrating the configuration of the bolt setting part 23. As illustrated in FIG. 3, the magazine plate 20 includes a through hole 24 extending from the upper face 21 to the lower face 22 about an axial line L1 taken in the up-down direction, at a position on the right of the sliding member 45. In addition, a groove part 25 coaxial with the through hole 24 is formed along the upper edge of the through hole 24. An annular magnet 26 having the same inner diameter as the through hole 24 is fitted in the groove part 25, so as to constitute the bolt setting part 23.

The bolt 2 is disposed in the up-down direction so that a axial line L2 which constitutes a central axis of the bolt coincides with the axial line L1 of the through hole 24. The head 2a of the bolt 2 is larger in diameter than the through hole 24. Accordingly, the end face of the head 2a is in contact with the bolt setting part 23. Thus, the head 2a covers the through hole 24, and the threaded portion 2b of the bolt 2 is directed upward. A washer 2c is fitted onto the bolt 2 from the side of the threaded portion 2b. The head 2a includes a tool insertion groove 2d formed on the end face, in which a tip portion 34 of the rotary rod device 30 is to be inserted.

The bolt 2 is formed of a magnetic material such as iron. Since the magnet 26 constitutes the bolt setting part 23 in this embodiment, the bolt 2 can be positioned on the bolt setting part 23 by magnetic force and stably retained thereon. The through hole 24 of the magazine plate 20 has a diameter larger than the outer diameter of the tip portion 34 of the rotary rod device 30. Accordingly, the tip portion 34 can be inserted into the through hole 24 without contacting the magazine plate 20, and tip portion 34 of the rotary rod device 30 can be inserted in the tool insertion groove 2d of the bolt 2 via the through hole 24.

As illustrated in FIG. 2, the rotary rod device 30 includes a base portion 31 and a rotary part 32 set to rotate about an axial line L3 (see FIG. 3). The rotary part 32 extends in the up-down direction. The rotary part 32 includes the tip portion 34, and a tool portion to be inserted in the tool insertion groove 2d of the head 2a of the bolt 2 is formed on the tip portion 34. The base portion 31 accommodates therein an electric motor 33 which rotationally drives the tip portion 34 of the rotary part 32.

A cylinder device 35 including a rod 37 set to move up and downward by high pressure air is attached to the right face of the side plate 44. A bracket 36 is attached to the upper end portion of the rod 37. The bracket 36 is formed so as to extend to the right, and the base portion 31 of the rotary rod device 30 is fixed to the bracket 36, with the tip portion 34 of the rotary rod device 30 directed upward. Accordingly, when the cylinder device 35 is driven, the rotary rod device 30 is caused to move upward and downward (direction of an arrow B) under the magazine plate 20, maintaining the position of the axial line L3 unchanged. The axial line L3 corresponds to the rotation axis of the rotary part 32, as well as to the axial line of the rotary rod device 30. The position of the rotary rod device 30 in the left-right direction is determined so that the axial line L3 of the rotary rod device 30 and the axial line L1 of the through hole 24 coincide with each other by moving the magazine plate 20 in the front-back direction.

Figure 4:
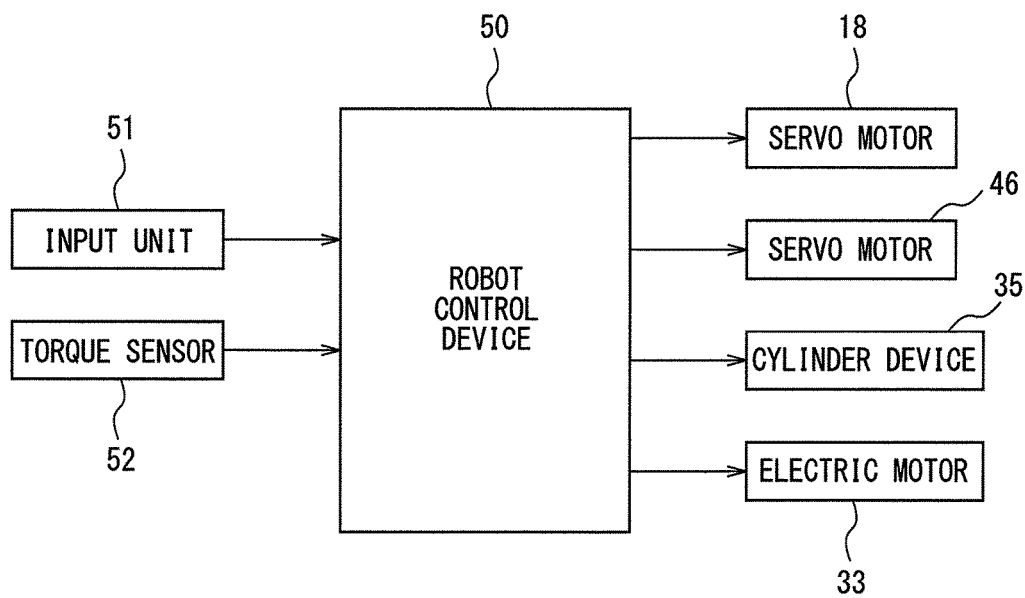
FIG. 4 is a block diagram illustrating a configuration for controlling the screw tightening apparatus according to the embodiment of the present invention.

FIG. 4 is a block diagram illustrating a configuration for controlling the screw tightening apparatus 100 according to the embodiment of the present invention. In FIG. 4, a robot control device 50 is constituted of an arithmetic processing unit including a CPU (central processing unit), a ROM (read only memory), a RAM (random access memory), and peripheral circuits. The robot control device 50 receives signals from an input unit 51 through which various instructions are inputted, and a torque sensor 52 which detects a torque generated when the rotary rod device 30 is driven to rotate. The robot control device 50 performs the operation to be subsequently described on the basis of the signals from the input unit 51 and the torque sensor 52, and outputs control signals to the servo motor 18 for driving the robot, the servo motor 46 for moving the magazine plate 20 in the front-back direction, the cylinder device 35 for moving the rotary rod device 30 up and downward, and the electric motor 33 for driving the rotary rod device 30.

Figure 5:
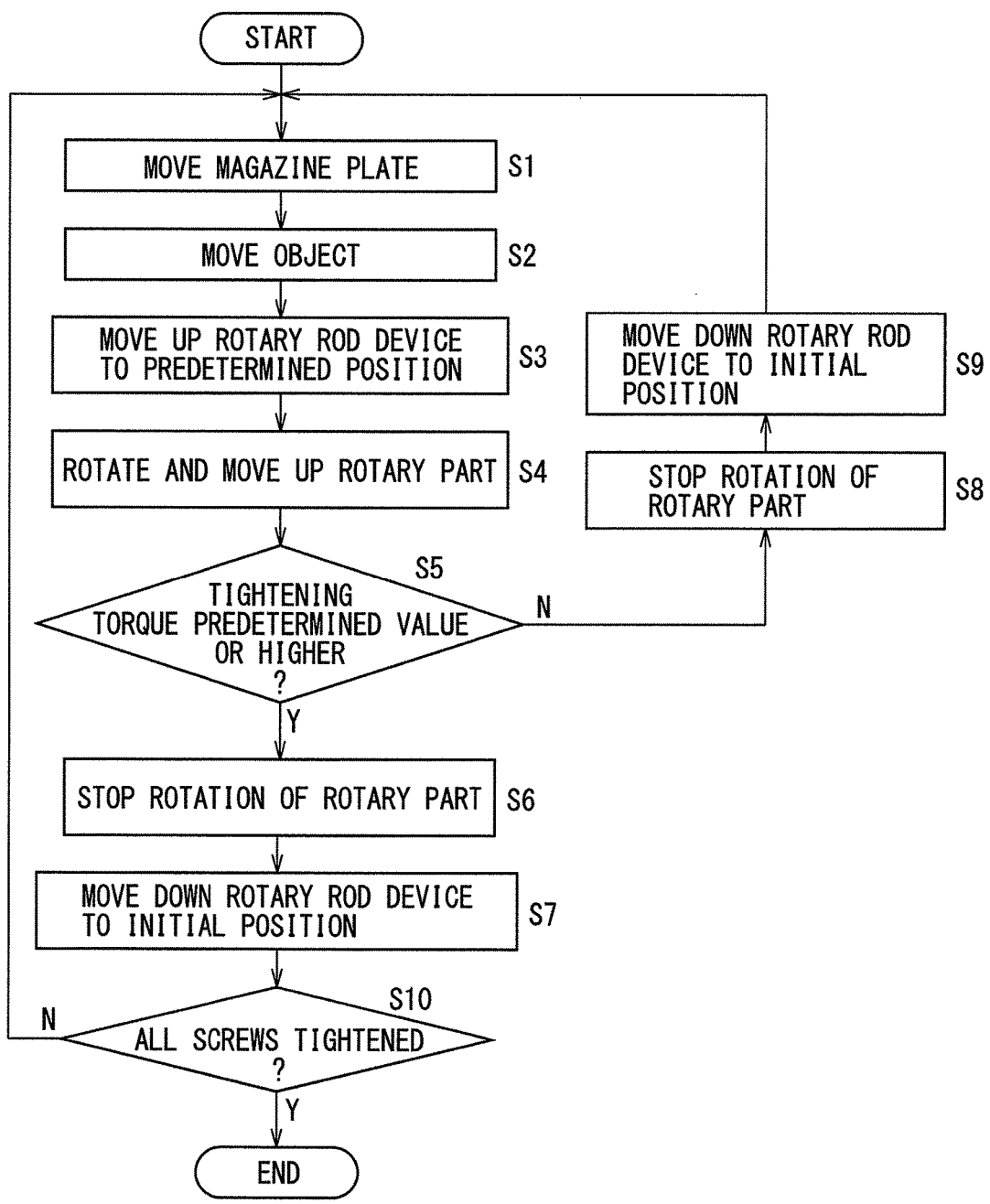
FIG. 5 is a flowchart illustrating one example of an operation performed by the robot control device in FIG. 4.

FIG. 5 is a flowchart illustrating an example of the operation performed by the robot control device 50. The operation specified in the flowchart is started for example when an instruction to start the screw tightening operation is inputted by operating the input unit 51, after the bolts 2 are arranged on the respective bolt setting parts 23 on the magazine plate 20. When the screw tightening operation is started, the rotary rod device 30 is set at an initial position and hence the tip portion 34 of the rotary rod device 30 is located at a position lower than the lower face 22 of the magazine plate 20.

At step S1, a control signal is output to the servo motor 46 so as to move the magazine plate 20 in the front-back direction so that the axial line L1 of the through hole 24 coincides with the axial line L3 of the rotary rod device 30. At step S2, a control signal is output to the servo motor 18 so as to activate the robot 102 and move the object 1, so that the screw hole 1a of the object 1 (see FIG. 6B) gripped by the hand 17 of the robot 102 is opposed to the tip portion of the bolt 2 on the magazine plate, and that an axial line L4, constituting the central axis of the screw hole 1a, coincides with the axial line L2 of the bolt 2.

At step S3, a control signal is output to the cylinder device 35 so as to lift up the rotary rod device 30 to a predetermined position, for example until the tip portion 34 of the rotary rod device 30 abuts on the head 2a of the bolt 2, and further the tip portion of the bolt 2 is brought into contact with the lower edge of the screw hole 1a of the object 1. At step S4, a control signal is output to the electric motor 33 so as to rotate the rotary part 32, and a control signal is output to the cylinder device 35 so as to lift up the rotary rod device 30. In other words, the rotary part 32 including the tip portion 34 is lifted up while being made to rotate. Thus, the bolt 2 is screwed in the screw hole 1a.

At step S5, it is judged if the screw tightening torque has reached equal to or higher than a predetermined value, on the basis of a signal from the torque sensor 52. In other words, it is judged if the bolt 2 has been screwed all the way into the screw hole 1*a* of the object 1. When an affirmative decision is acquired at step S5 the operation proceeds to step S6, and when a negative decision is acquired the operation proceeds to step S8.

At step S8, a control signal is output to the electric motor 33 so as to stop the rotation of the rotary part 32 of the rotary rod device 30. Further, at step S9, a control signal is output to the cylinder device 35 so as to move the rotary rod device 30 downward to the original position (initial position), and resumes the operation from step S1. In this case, it is judged that the torque has not reached to the predetermined value because of a relative positional shift between the screw hole of the object 1 and the bolt 2, the rotary rod device 30 is moved to the original position, and movements of the magazine plate 20 and the object 1 are performed again.

In contrast, at step S6 a control signal is output to the electric motor 33 so as to stop the rotation of the rotary part 32 of the rotary rod device 30, on the assumption that the tightening of the bolt 2 has been completed. At step S7, a control signal is output to the cylinder device 35 so as to move the rotary rod device 30 downward to the original position (initial position). Then, at step S10, it is judged if the tightening of the bolt 2 in the screw hole 1*a* of the object 1 has been completed. For example, when a plurality of bolts 2 are to be respectively screwed in a plurality of screw holes 1*a* of the object 1, it is judged if the bolts 2 have been respectively screwed in all of the screw holes 1*a*. When a negative decision is acquired at step S10 the operation returns to step S1. In this case, the magazine plate 20 is moved in the front-back direction by a distance corresponding to one pitch, and the same operation is repeated. When an affirmative decision is acquired at step S10, the operation is finished.

Figure 6A:
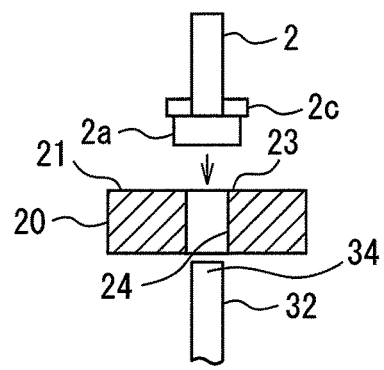
FIG. 6A is a first view for illustrating the operation of the screw tightening apparatus according to the embodiment of the present invention.

The operation of the screw tightening apparatus 100 according to this embodiment may be summarized as follows. When the screw tightening operation is performed, for example the operator manually places the head 2*a* of the bolt 2 in advance on the bolt setting part 23 on the upper face 21 of the magazine plate 20 in the preparation work, as illustrated in FIG. 6A. The bolts 2 may be automatically placed by the robot. With the bolts 2 thus prepared, the screw tightening apparatus 100 starts the screw tightening operation.

Figure 6B:
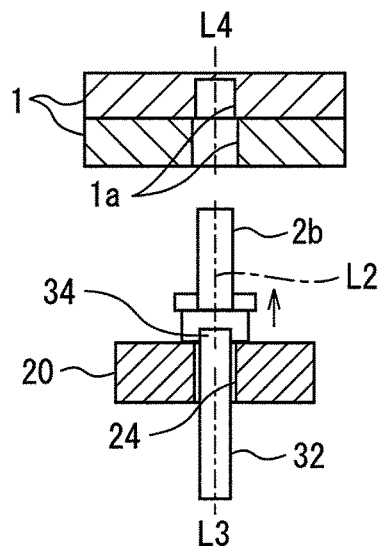
FIG. 6B is a second view for illustrating the operation of the screw tightening apparatus according to the embodiment of the present invention.

First, the magazine plate 20 is moved in the front-back direction so that the through hole 24 of the magazine plate 20 is positioned coaxially with the tip portion 34 of the rotary rod device 30 (step S1). Then the object 1 is moved, as illustrated in FIG. 6B, so that the screw hole 1*a* of the object 1 is opposed to the tip portion of the bolt 2, more precisely the tip portion of the threaded portion 2*b*, and positioned coaxially therewith (step S2). FIG. 6B illustrates an example where the object 1 is constituted of a pair of vertically stacked parts to be fastened with the bolt 2.

Figure 6C:
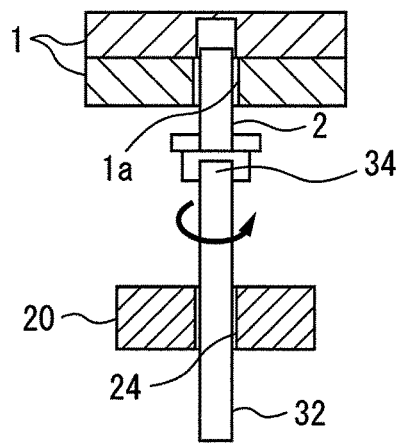
FIG. 6C is a third view for illustrating the operation of the screw tightening apparatus according to the embodiment of the present invention.

Then the rotary rod device 30 is moved upward from the initial position until the tip portion 34 of the rotary part 32 abuts on the tool insertion groove 2*d* of the head 2*a* of the bolt 2, via the through hole 24. The rotary rod device 30 is lifted up and the rotary rod device 30 and the bolt 2 are then moved upward with the tip portion 34 engaged with the tool insertion groove 2*d*, until the tip portion of the bolt 2 is brought into contact with the screw hole 1*a* of the object 1 (step S3). Further, the rotary part 32 is moved upward while being made to rotate (step S4). The bolt 2 is thus screwed in the screw hole 1*a* of the object 1, as illustrated in FIG. 6C.

When the bolt 2 is completely screwed, the screw tightening torque reaches or exceeds the predetermined value. Accordingly, the rotation of the rotary part 32 is stopped and the rotary rod device 30 is moved downward to the initial position (step S6, step S7). At this point, the tightening of a single bolt 2 is completed. Then the magazine plate 20 is shifted in the front-back direction by a distance corresponding to one pitch and the next bolt 2 is screwed in the screw hole 1*a* of the object 1 in the same way. When all the bolts 2 are tightened, the screw tightening operation is finished.

This embodiment provides the following advantageous effects.

(1) The screw tightening apparatus 100 includes the screw tightening unit 101 and the robot 102. The screw tightening unit 101 includes the magazine plate 20 including the through hole 24 formed in the up-down direction and the bolt setting part 23 provided at the opening edge of the through hole 24 and configured to set the bolt 2 coaxially with the through hole 24, with the head 2*a* of the bolt 2 disposed so as to cover the through hole 24, and the rotary rod device 30 extending in the up-down direction and including the electric motor 33 which rotates the tip portion 34. The screw tightening unit 101 includes the servo motor 46 which moves the magazine plate 20 in the front-back direction, and the cylinder device 35 which moves the rotary rod device 30 in the up-down direction. The screw tightening unit 101 also includes the robot control device 50 which controls the servo motor 46 so as to locate the tip portion 34 of the rotary rod device 30 coaxially with the through hole 24, and controls the cylinder device 35 so as to cause the tip portion 34 of the rotary rod device 30 to pass the through hole 24 and abut on the head 2*a* of the bolt 2 in the state where the tip portion 34 of the rotary rod device 30 is located coaxially with the through hole 24. By adopting this configuration, the direction in which the bolt 2 is removed from the magazine plate 20 and the direction in which the bolt 2 is tightened are the same, and therefore the bolt 2 can be removed and moved in the direction of the tightening with a single actuator (cylinder device 35). Consequently, the configuration of the apparatus can be simplified and hence the manufacturing cost can be reduced. In addition, since the removal and the tightening of the bolt 2 can be performed through a common action (i.e., lifting up the rotary rod device 30), the cycle time for the bolt tightening can be shortened.

(2) The robot 102 moves the object 1 so that the screw hole 1*a* of the object 1 is opposed to the tip portion of the bolt 2 placed on the bolt setting part 23, and positioned coaxially with the robot 2. Accordingly, the position and the posture of the object 1 can be easily adjusted. Such a configuration enables the position and the posture of the object 1 to be readjusted and the bolt tightening operation to be resumed, when it is decided that the bolt 2 has failed to be properly tightened because of the screw tightening torque not having reached the predetermined value.

(3) The robot control device 50 which controls the servo motor 18 for driving the robot also controls the servo motor 46 for driving the magazine plate. Therefore, the bolt 2 can be accurately positioned with respect to the screw hole 1*a* of the object 1 while the positional relationship between the magazine plate 20 and the object 1 is obtained.

(4) Since the magnet 26 is employed to constitute the bolt setting part 23, the bolt 2 can be stably placed on the bolt setting part 23. Therefore, the bolt 2 can be prevented from being displaced or falling off, and the screw tightening operation can be stably performed.

Figure 7:
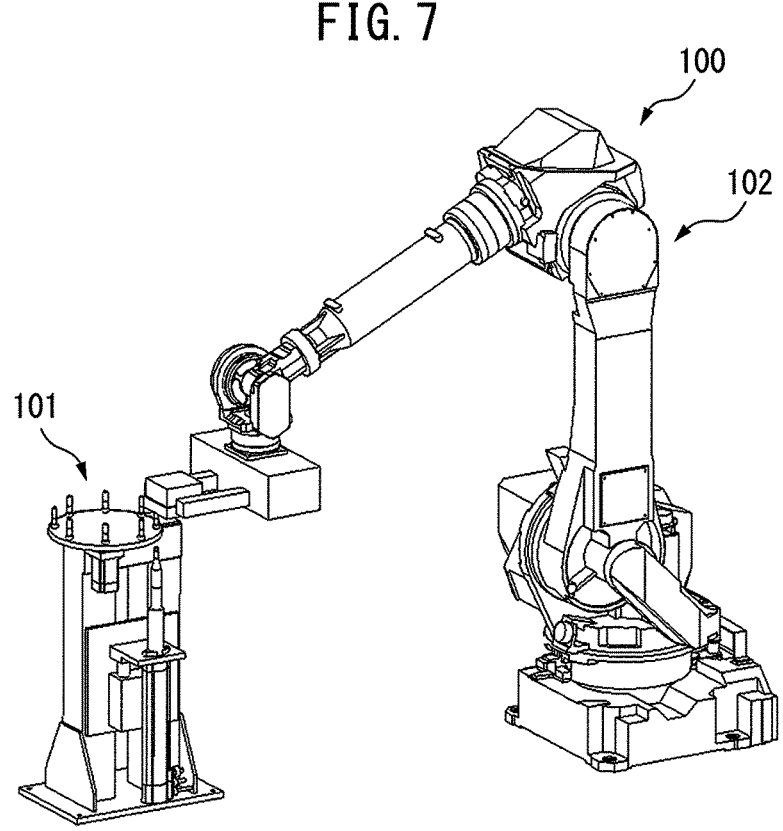
FIG. 7 is a perspective view of a variation of FIG. 1.
Figure 8:
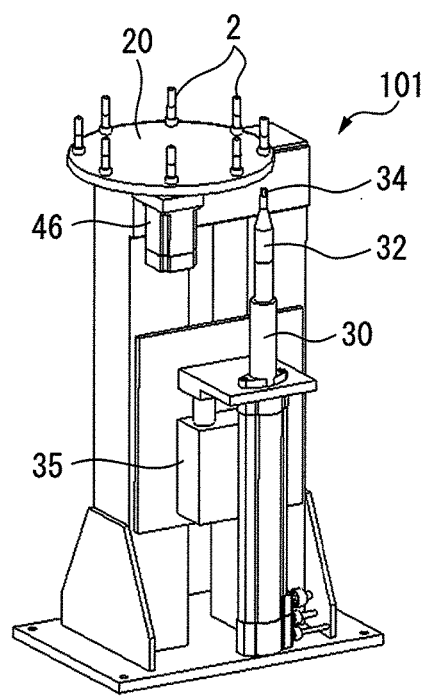
FIG. 8 is an enlarged perspective view of a screw tightening unit included in the screw tightening apparatus of FIG. 7.

The screw tightening apparatus 100 thus far described may be modified in various manners. FIG. 7 illustrates a variation of FIG. 1. FIG. 7 is different from FIG. 1 in the configuration of the screw tightening unit 101. FIG. 8 is an enlarged view of the screw tightening unit 101 of FIG. 7. As is apparent from FIG. 8, the magazine plate 20 is formed in a circular disk shape. The magazine plate 20 is driven to rotate by the servo motor 46, and the robot control device 50 determines the positions so that the bolt 2 placed on the magazine plate is located coaxially with the rotary rod device 30.

Although the magazine plate 20 includes the through hole 24 formed in the up-down direction between the upper face 21 (first face) and the lower face 22 (second face), and the rotary rod device 30 is caused to move in the up-down direction in the embodiment (see FIG. 2) and the variation (see FIG. 8), the first direction may be other than the up-down direction (e.g., left-right direction) as long as the extending direction of the through hole 24 and the moving direction of the rotary rod device 30 are the same. Accordingly, the second direction (perpendicular to the first direction) in which the magazine plate 20 moves relative to the rotary rod device 30 may be other than the front-back direction. Although the magnet 26 is provided in the bolt setting part 23 in the embodiment (see FIG. 3), the bolt setting part 23 may be differently configured. For example, the bolt setting part 23 may be constituted of a groove part formed on the upper face 21 of the magazine plate 20, in which the head 2a of the bolt 2 is to be fitted. In this case, the head 2a of the bolt 2 can be stably retained by the groove part formed on the upper face of the magazine plate 20.

In the foregoing embodiment, the first moving unit which moves the magazine plate 20 relative to the rotary rod device 30 includes the servo motor 46. In other words, the servo motor 46 causes the magazine plate 20 to move. However, the first moving unit may be configured in a desired manner as long as the magazine plate 20 can be moved relative to the rotary rod device 30 in the second direction perpendicular to the axial line L1 of the through hole 24 (front-back direction in FIG. 2). For example, the magazine plate 20 may be fixed and the rotary rod device 30 may be moved in the second direction.

In the embodiment, the second moving unit which moves the rotary rod device 30 in the first direction includes the cylinder device 35. In other words, the cylinder device 35 causes the rotary rod device 30 to move in the first direction (up-down direction in FIG. 2) toward the head 2a of the bolt 2. However, the second moving unit may be differently configured as desired, provided that the rotary rod device 30 can be moved in the first direction.

In the embodiment, further, the object moving unit which moves the object to be screwed 1 is constituted of the robot 102. In other words, the robot 102 moves the object to be screwed 1. However, the object moving unit may be configured so as to move the object to be screwed with a device other than the robot.

In addition, in the embodiment the rotary drive unit which rotates the tip portion 34 includes the electric motor 33. However, the rotary drive unit may be configured so as to rotate the tip portion 34 with a device other than the electric motor.

The configuration of the robot control device 50 according to the embodiment is only exemplary. The robot control device 50 may be configured in any different manner as long as the first moving unit (servo motor 46) is controlled so as to locate the tip portion 34 of the rotary rod device 30 coaxially with the through hole 24, and the second moving unit (cylinder device 35) is controlled, upon locating the tip portion 34 of the rotary rod device 30 coaxially with the through hole 24, so as to cause the tip portion 34 of the rotary rod device 30 to pass the through hole 24 and abut on the head 2a of the bolt 2. Further, the robot control device serving as an object control unit may be configured as desired provided that the object moving unit (robot 102) can be controlled so as to move the object 1 so that the screw hole 1a of the object 1 is opposed to the tip portion of the bolt 2 placed on the bolt setting part 23, and positioned coaxially with the bolt 2. Although the robot control device 50 serves to control both of the robot 102 and the screw tightening unit 101 in the embodiment, the screw tightening unit 101 may be controlled by another control unit other than the robot control device 50.

The present invention allows the bolt to be removed from the magazine plate by moving the rotary rod device in the first direction, and enables the bolt thus removed to be directly screwed in the screw hole of the object to be screwed. Therefore, the configuration of the apparatus can be simplified and hence the manufacturing cost can be reduced. In addition, the cycle time of the screw tightening operation can be shortened.

The description thus far given is merely exemplary, and in no way intended to limit the present invention to the foregoing embodiment and the variations thereof. The constituents of the embodiment and the variations thereof include those that may be substituted or are obviously substitutable without compromising the identity of the invention. In other words, different configurations which can be reached within the technical scope of the present invention will also be included in the present invention. Further, the foregoing embodiment may be combined with one or a plurality of the variations.

The invention claimed is:

1. A screw tightening apparatus which screws a bolt in a screw hole of an object to be screwed, the apparatus comprising:

a magazine plate including a first face, a second face opposite to the first face, a through hole formed in a first direction extending from the first face to the second face, and a bolt setting part provided at an opening edge of the through hole on a side of the first face and configured to set the bolt coaxially with the through hole, with a head of the bolt disposed so as to cover the through hole;

a rotary rod device including a rotary part extending parallel to the first direction with a tip portion opposed to the second face of the magazine plate, and a rotary drive unit which rotates the tip portion;

a first moving unit which moves the magazine plate relative to the rotary rod device in a second direction perpendicular to the first direction;

a second moving unit which moves the rotary rod device in the first direction; and a screw tightening control unit which controls the first moving unit so as to locate the tip portion of the rotary rod device coaxially with the through hole, and controls the second moving unit so as to cause the tip portion of the rotary rod device to pass the through hole and abut on the head of the bolt in the state where the tip portion of the rotary rod device is located coaxially with the through hole.

2. The screw tightening apparatus according to claim 1, further comprising:

an object moving unit which moves the object to be screwed; and an object control unit which controls the object moving unit so that the screw hole of the object to be screwed is opposed to a tip portion of the bolt placed on the bolt setting part, and positioned coaxially with the bolt.

3. The screw tightening apparatus according to claim 2, wherein the object moving unit is constituted of a robot, and the object control unit is a robot control device which controls the robot.

4. The screw tightening apparatus according to claim 3, wherein the screw tightening control unit is included in the robot control device.

5. The screw tightening apparatus according to claim 1, wherein the bolt setting part is constituted of a magnet.

* * * * *